US012565104B2

(12) United States Patent
Opris

(10) Patent No.: US 12,565,104 B2
(45) Date of Patent: Mar. 3, 2026

(54) SYSTEM AND METHOD FOR WIRELESS TRANSFER OF PERSONAL VEHICLE CONFIGURATIONS

(71) Applicant: FCA US LLC, Auburn Hills, MI (US)

(72) Inventor: Cornelius Opris, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 201 days.

(21) Appl. No.: 18/359,487

(22) Filed: Jul. 26, 2023

(65) Prior Publication Data

US 2025/0033469 A1     Jan. 30, 2025

(51) Int. Cl.
B60K 35/00        (2024.01)
B60K 35/85        (2024.01)
B60R 16/037       (2006.01)
B60K 35/80        (2024.01)

(52) U.S. Cl.
CPC ............ B60K 35/85 (2024.01); B60R 16/037 (2013.01); *B60K 35/80* (2024.01); *B60K 2360/56* (2024.01); *B60K 2360/589* (2024.01)

(58) Field of Classification Search
CPC ........ B60K 35/00; B60K 35/80; B60K 35/85; B60K 2360/56; B60K 2360/589; B60R 16/037
See application file for complete search history.

(56) References Cited

U.S. PATENT DOCUMENTS 9,171,268 B1 *  10/2015  Penilla ...................... B60L 1/06
9,533,640 B2 *  1/2017   Rai ....................... B60W 40/08
10,554,759 B2 *  2/2020  Penilla .................... B60L 53/65
11,794,676 B1 *  10/2023  Benqassmi ........... B60W 10/00
2019/0199800 A1 *  6/2019  Penilla ............... G01C 21/3641
2021/0152665 A1 *  5/2021  Hart ......................... H04L 67/34
2021/0316754 A1 *  10/2021  Bielby ................. B60W 10/20
2022/0024446 A1 *  1/2022  Tiziani ............... B60W 30/025

FOREIGN PATENT DOCUMENTS

DE      102014115250 A1 *  4/2016  .......... H04L 67/125
DE      102019220366 A1 *  6/2021  .......... B60R 16/037

OTHER PUBLICATIONS

Tesla Model 3 Owner's Manual; retrieved from the Internet on Jul. 24, 2023 (https://www.tesla.com/ownersmanual/model3/en_jo/GUID-A2D0403E-3DAC-4695-A4E6-DC875F4DEDC3.html).

* cited by examiner

*Primary Examiner* — Peter D Nolan
*Assistant Examiner* — Demetra R Smith-Stewart
(74) *Attorney, Agent, or Firm* — Jeremy J. Klobucar

(57)             ABSTRACT

A vehicle settings transfer system includes a computing device that receives, at a secure server, registration information associated with a user and a first vehicle. Personalized vehicle settings of the first vehicle associated with the user are stored at the secure server. A request to transfer the personalized vehicle settings associated with the first vehicle to a second vehicle is received. A confirmation is made, at the secure server, that the second vehicle is registered to the user of the first vehicle. Based on the confirming, the personalized vehicle settings associated with the first vehicle are sent from the secure server to the second vehicle. The personalized vehicle settings associated with the first vehicle are loaded to the second vehicle.

10 Claims, 3 Drawing Sheets

SYSTEM AND METHOD FOR WIRELESS TRANSFER OF PERSONAL VEHICLE CONFIGURATIONS

FIELD

The present application relates generally to vehicles that store personalized settings and, more particularly, to systems and methods to transfer personalized vehicle settings from one vehicle to another vehicle.

BACKGROUND

Many vehicles are equipped with the ability to set and store personalized settings related to radio presets/settings, navigation settings, mirror position settings, seat position settings and other settings. In examples, a user can typically interface with these settings through infotainment or multimedia systems that allow a user to update and store such settings. In other examples, a user can save such settings by buttons available throughout the cabin (such as a mirror save or seat save button).

When a vehicle owner purchases or leases a new vehicle, all previous personalized settings remain with the old vehicle. In this regard, a user needs to establish and reset all personalized settings in the new vehicle. Many times a new vehicle will have similar available settings as a previous vehicle to personalize making the resetting of known settings into the new car frustrating and/or time consuming for the vehicle user. Accordingly, while such personal settings systems do work for their intended purpose, there is a desire for improvement in the relevant art.

SUMMARY

In accordance with one example aspect of the invention, a vehicle settings transfer system includes a computing device including one or more processors, a communication device for communication with a secure server via a network, and a non-transitory computer-readable storage medium having a plurality of instructions stored thereon, which, when executed by the one or more processors, cause the one or more processors to perform operations comprising: receive, at the secure server, registration information associated with a user and a first vehicle. Personalized vehicle settings of the first vehicle associated with the user are stored at the secure server. A request to transfer the personalized vehicle settings associated with the first vehicle to a second vehicle is received. A confirmation is made, at the secure server, that the second vehicle is registered to the user of the first vehicle. Based on the confirming, the personalized vehicle settings associated with the first vehicle are sent from the secure server to the second vehicle. The personalized vehicle settings associated with the first vehicle are loaded to the second vehicle.

In addition to the foregoing, the system receives, at the server, a request to transfer the personalized vehicle settings. In other examples, the system receives, at the computing device, a request to transfer the personalized vehicle settings.

In addition to the foregoing, the computing device comprises a vehicle infotainment system. In other examples, the computing device comprises a mobile device. The mobile device executes instructions set forth in an application that is configured to communicate with the server.

In other examples, the personalized settings include at least one of seat position settings, mirror position settings, steering wheel settings, cruise control settings, garage door code settings, language settings, camera settings, trailer settings, speed limit settings, wiper settings, safety and driver assistance settings, voice settings, display settings, unit settings, key off settings, and satellite radio settings.

In accordance with another example aspect of the invention, a method of transferring vehicle settings from a first vehicle to a second vehicle includes providing a computing device, including one or more processors, a communication device for communication with a secure server via a network, and a non-transitory computer-readable storage medium having a plurality of instructions stored thereon, which, when executed by the one or more processors, cause the one or more processors to perform operations. Registration information associated with a user and a first vehicle is received at a secure server. Personalized vehicle settings of the first vehicle associated with the user is stored at the secure server. A request to transfer the personalized vehicle settings associated with the first vehicle to the second vehicle is received at the secure server. A confirmation is made at the secure server that the second vehicle is registered to the user of the first vehicle. Based on the confirming, the personalized vehicle settings associated with the first vehicle are sent from the secure server to the second vehicle. The personalized vehicle settings associated with the first vehicle are loaded to the second vehicle.

In addition to the foregoing, a request to transfer the personalized vehicle settings is received at the computing device. Receiving the request to transfer the personalized vehicle settings comprises receiving the request at a vehicle infotainment system.

In other examples, receiving the request to transfer the personalized vehicle settings comprises receiving the request at a mobile device. The mobile device executes instructions set forth in an application that is configured to communicate with the server. The personalized settings include at least one of seat position settings, mirror position settings, steering wheel settings, cruise control settings, garage door code settings, language settings, camera settings, trailer settings, speed limit settings, wiper settings, safety and driver assistance settings, voice settings, display settings, unit settings, key off settings, and satellite radio settings.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, many vehicles are equipped with the ability to set and store personalized settings related to radio presets/settings, navigation settings, mirror position settings, set position settings and other settings. In examples, a user can typically interface with these settings through infotainment or multimedia systems that allow a user to update and store such settings. In other examples, a user can save such settings by buttons available throughout the cabin (such as a mirror save or seat save button). Various vehicle settings can be saved in the infotainment systems and/or in a vehicle controller, such as a body controller. When a vehicle owner purchases or leases a new vehicle, all previous personalized settings remain with the old vehicle and a user needs to establish and reset all personalized settings in the new vehicle. Many times, a user's new vehicle is a similar make and/or model making the reestablishing of preferred settings more frustrating.

Accordingly, systems and methods are provided for transferring personalized vehicle settings of a user from a previous vehicle to a new vehicle. As will be described, a user registers the vehicle to associate a vehicle, and subsequent vehicle settings of that vehicle (including multiple settings for multiple users) over the ownership period, to a specific user or users. In this regard, a new vehicle can be registered at purchase or lease. Registration ties any vehicle settings (and updates) of that particular vehicle (including first, second or more user profile settings) to the vehicle user (e.g., owner).

Once registered, the vehicle settings are associated to a vehicle user or user profile. The user profile can be saved locally at the vehicle, at a key Fob, at a mobile device, and/or remotely at a server. The user profile can then be transferred to another vehicle, such as a new vehicle, after registration of the subsequent vehicle. As will become appreciated, a registered vehicle may have more than one user (e.g. driver 1, driver 2, etc.) each having associated settings that can all be stored and available through a requested transfer.

Figure 1:
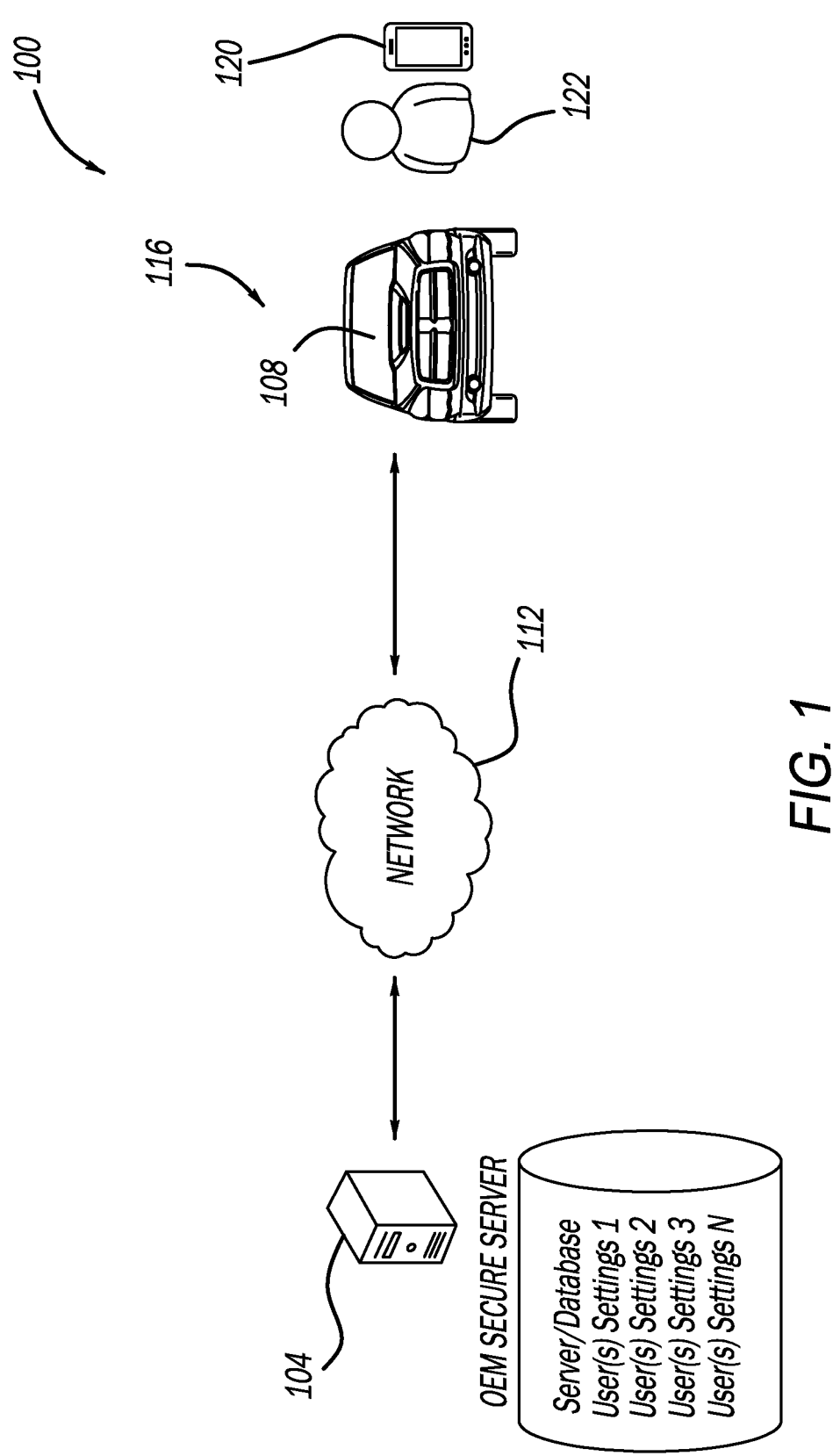
FIG. 1 is a diagram of an example vehicle settings transfer system for a vehicle, in accordance with the principles of the present application.

With reference now to FIG. 1, a diagram of an example vehicle settings transfer system 100 is illustrated in accordance with the principles of the present disclosure. In the example embodiment, the vehicle settings transfer system 100 may be a computing system that includes a secure backend server 104 configured to communicate with a vehicle computing device 108 via a network 112. The backend secure server 104 may include one or more secure servers, which for example, are owned and operated by a particular vehicle original equipment manufacturer (OEM) and are only accessible to authorized users, such as a particular type or brand of vehicle.

In the example embodiment, the vehicle computing device 108 is an infotainment or multimedia system for a vehicle 116, but it will be appreciated that vehicle computing device 108 may be any suitable vehicle computing device configured to receive vehicle settings. The network 112 can be any suitable communication network including, for example, a satellite network, a cellular network (3G, 4G LTE, 5G, etc.), a computing network (local area network, the internet, etc.), or some combination thereof.

Figure 2:
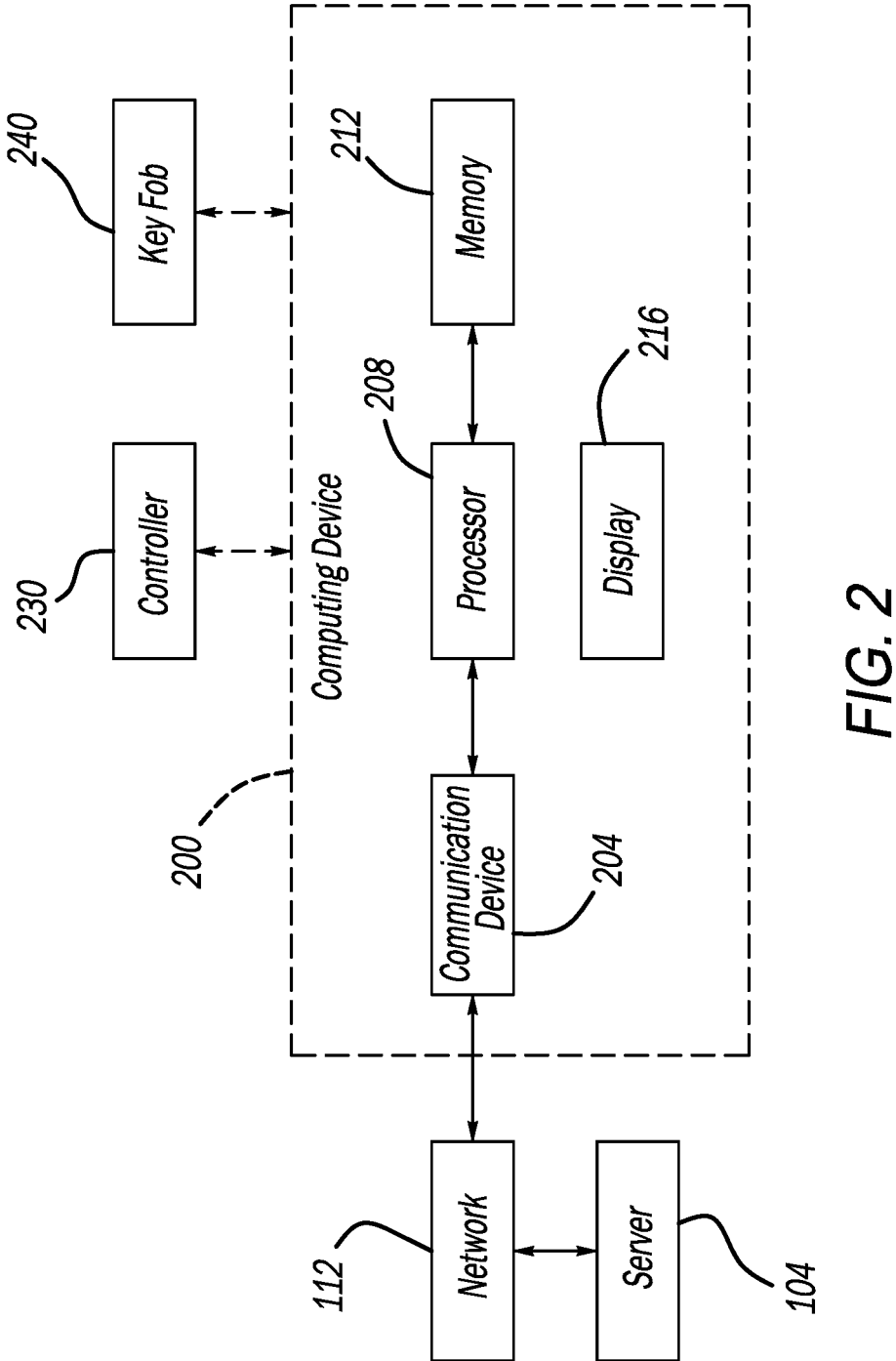
FIG. 2 is a functional block diagram of an example vehicle computing device of the system of FIG. 1, in accordance with the principles of the present application.

Referring now to FIG. 2, a functional block diagram of an example computing device 200 is illustrated. The computing device 200 can represent the configuration of the vehicle computing device 108, such as an infotainment or multimedia system for vehicle 116 that is configured to communicate with the backend server 104 and/or components of the communication network 112. In other configurations, computing device 200 may additionally or alternatively be a personal electronic device 120 (e.g., smart phone, laptop computer, tablet computer, etc.) associated with an owner 122 of the vehicle 116 (see also FIG. 1). In the example embodiment, the computing device 200 includes a communication device 204, a processor 208, a memory 212, and a display 216. A vehicle controller 230, such as a body controller, can additionally or alternatively save personalized vehicle settings locally in the vehicle 116. Additionally or alternatively, a key Fob 240 can save personalized vehicle settings.

In the example embodiment, the communication device 204 (e.g., a wireless transceiver) is configured for communication via the network 112, and the processor 208 is configured to control operation of the computing device 200. The term "processor" as used herein can refer to both a single processor and two or more processors operating in a parallel or distributed architecture. The memory 212 can be any suitable storage medium (flash, hard disk, etc.) configured to store information at the computing device 200. In one implementation, the memory 212 is a non-transitory computer-readable storage medium configured to store instructions executable by the processor 208 to cause the computing device 200 to perform at least a portion of the disclosed techniques.

The display 216 may be a touchscreen display configured to display one or more soft buttons (not shown) to facilitate performing at least a portion of the disclosed techniques. While not shown, it will be appreciated that computing device 200 can include other suitable components such as physical buttons, sensors, and the like. As further described below, the example vehicle settings transfer system 100 is configured to perform various techniques for transferring personalized vehicle settings or user profiles from one vehicle to another vehicle. It will be appreciated that vehicle settings can include any vehicle settings such as, but not limited to, seat position settings, mirror position settings, steering wheel settings, cruise control settings, garage door code settings, language settings, camera settings, trailer settings, speed limit settings, wiper settings, safety and driver assistance settings, voice settings, display settings, unit settings, key off settings, and satellite radio settings. It will further be appreciated that while the following discussion is directed toward a user purchasing or buying a new vehicle to replace an existing vehicle, the system and methods described herein can be applied generally to transferring personal settings from one vehicle to another vehicle.

Figure 3:
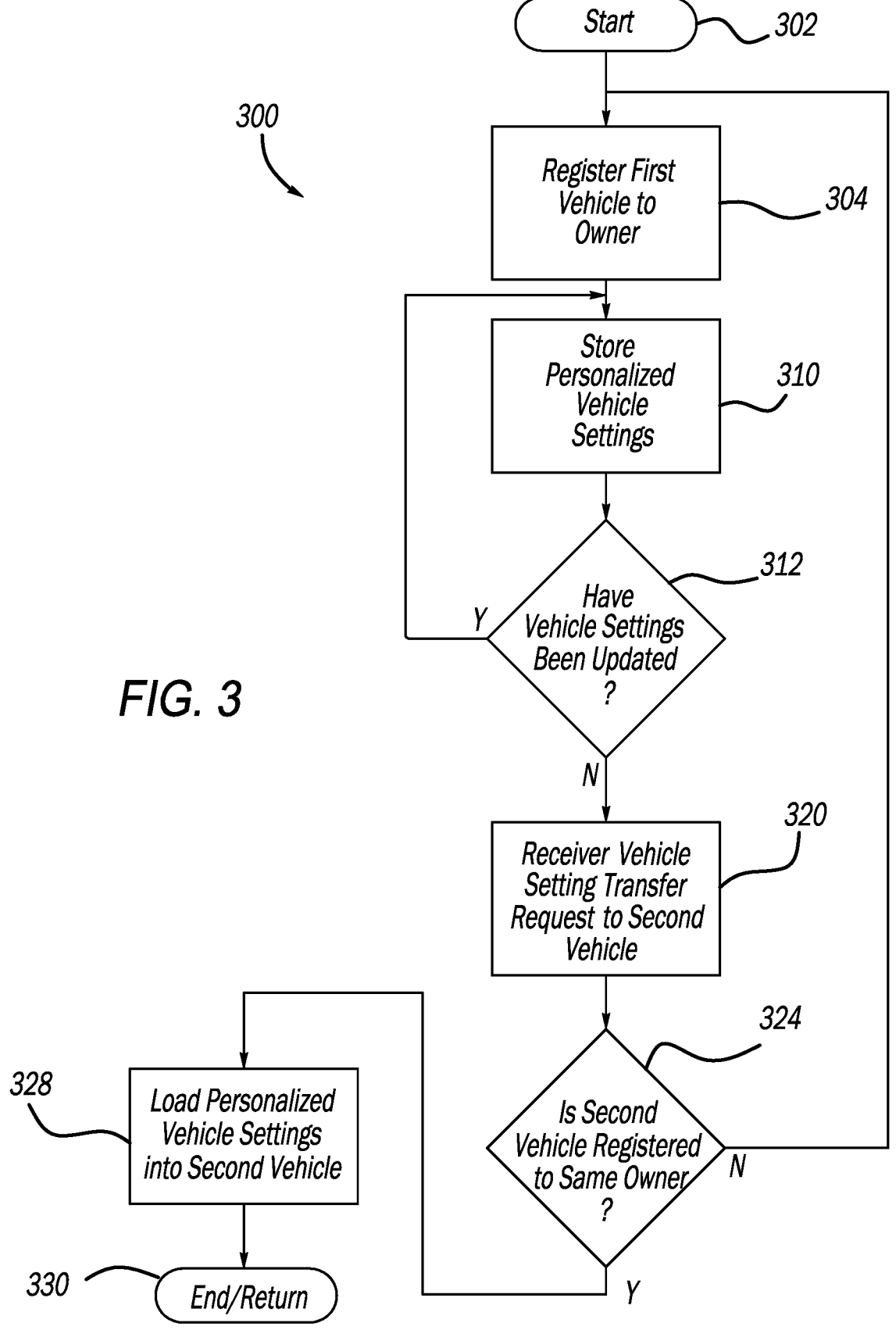
FIG. 3 is a flow diagram of an example vehicle settings transfer method, in accordance with the principles of the present application.

As shown in FIG. 3, an example computer-implemented method 300 for transferring personalized vehicle settings from a first vehicle to a second vehicle is provided. The method begins at step 302. At step 304, the vehicle computing device 200 receives registration information of the vehicle owner/user. In particular, the first vehicle is registered to the vehicle owner/user. The registration can be input through the computing device 200 (infotainment system) or mobile device 120. The registration information can then be communicated through the network 112 to the server 104. In other examples, the registration information can be additionally or alternatively stored at mobile device 120 (such as through an application), and/or the key Fob 240.

At 310, a user stores personalized vehicle settings. The vehicle settings can be stored at the computing device 200, at the controller 230, at the key Fob 240 and/or at the server

5

104. At 312, the method determines whether any of the vehicle settings have been updated. As can be appreciated, new vehicle settings can be made by the user anytime the user saves over previous vehicle settings to associate the settings to a particular vehicle user. If there have been updated vehicle settings, the method loops to 310 where the settings are stored.

If the vehicle settings have not been updated at 312, the method proceeds to 320 where a vehicle setting transfer request is received. A vehicle setting transfer request can be made through the computing device 200 or mobile device 120. It is contemplated that the vehicle setting transfer request can alternatively be made by the server 104 such as through a vehicle dealership during registration of the user (e.g., a user profile having personalized vehicle settings associated therewith) to another vehicle.

At 324, the method determines whether the second vehicle is registered to the same owner as the first vehicle to authorize any settings transfer. If the second vehicle matches the same user, the personalized vehicle settings associated with the user are sent, such as from the secure server 104, to the second vehicle and loaded into the second vehicle at step 328. It is appreciated that key Fob 240 may additionally or alternatively store the personalized information. In this regard, a data transfer may occur between first and second key Fobs 240. In additional examples, factory settings may be restored onto the first vehicle and/or deleting stored information on the computing device 200. In other examples, the first vehicle may maintain the settings such as when the vehicle owner retains the first vehicle and is simply adding a second vehicle. The method ends/returns at 330.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle settings transfer system, comprising:
a first key fob associated with a first vehicle;
a second key fob associated with a second vehicle; and
a computing device, including one or more processors, a communication device for communication with a secure server via a network, and a non-transitory computer-readable storage medium having a plurality of instructions stored thereon, which, when executed by the one or more processors, cause the one or more processors to perform operations including:
receive, at the first key fob, registration information associated with a user and the first vehicle;
store, at the first key fob, personalized vehicle settings of the first vehicle associated with the user;
receive, at the computing device, a request to transfer the personalized vehicle settings associated with the first vehicle to the second vehicle;
confirm, at the computing device, the second vehicle is registered to the user of the first vehicle;
send, from the first key fob, the personalized vehicle settings associated with the first vehicle to the second key fob associated with the second vehicle, based on confirming the second vehicle is registered to the user of the first vehicle;
load, from the second key fob, the personalized vehicle settings associated with the first vehicle to the second vehicle; and
manipulate one of a seat position and a mirror position of the second vehicle based on the loaded personalized vehicle settings.

2. The system of claim 1, wherein the computing device comprises a vehicle infotainment system.

3. The system of claim 1, wherein the computing device comprises a mobile device.

4. The system of claim 3, wherein the mobile device executes instructions set forth in an application that is configured to communicate with the server.

5. The system of claim 1 wherein the personalized settings include at least one of seat position settings, mirror position settings, steering wheel settings, cruise control settings, garage door code settings, language settings, camera settings, trailer settings, speed limit settings, wiper settings, safety and driver assistance settings, voice settings, display settings, unit settings, key off settings, and satellite radio settings.

6. A method of transferring vehicle settings from a first vehicle to a second vehicle, the method comprising:
providing a first key fob associated with the first vehicle;
providing a second key fob associated with the second vehicle;
providing a computing device, including one or more processors, a communication device for communication with a secure server via a network, and a non-transitory computer-readable storage medium having a plurality of instructions stored thereon, which, when executed by the one or more processors, cause the one or more processors to perform operations;
receiving, at the first key fob, registration information associated with a user and the first vehicle;
storing, at the first key fob, personalized vehicle settings of the first vehicle associated with the user;
receiving, at the computing device, a request to transfer the personalized vehicle settings associated with the first vehicle to the second vehicle;

confirming, at the computing device, the second vehicle is registered to the user of the first vehicle;

sending, from the first key fob, the personalized vehicle settings associated with the first vehicle to the second key fob associated with the second vehicle, based on confirming the second vehicle is registered to the user of the first vehicle;

loading, from the second key fob, the personalized vehicle settings associated with the first vehicle to the second vehicle; and manipulating one of a seat position and a mirror position of the second vehicle based on the loaded personalized vehicle settings.

7. The method of claim 6, wherein receiving, at the computing device, the request to transfer the personalized vehicle settings comprises receiving the request at a vehicle infotainment system.

8. The method of claim 6, wherein receiving, at the computing device, the request to transfer the personalized vehicle settings comprises receiving the request at a mobile device.

9. The method of claim 8, wherein the mobile device executes instructions set forth in an application that is configured to communicate with the server.

10. The method of claim 9, wherein the personalized settings include at least one of seat position settings, mirror position settings, steering wheel settings, cruise control settings, garage door code settings, language settings, camera settings, trailer settings, speed limit settings, wiper settings, safety and driver assistance settings, voice settings, display settings, unit settings, key off settings, and satellite radio settings.

\* \* \* \* \*